United States Patent
Grescher

[11] Patent Number: 6,128,821
[45] Date of Patent: Oct. 10, 2000

[54] MOTOR-VEHICLE EXHAUST-GAS CLEANING DEVICE AND METHOD FOR MAKING SAME

[75] Inventor: Bernard Grescher, Fischach, Germany

[73] Assignee: Zenuna-Starker GmbH & Co. KG, Augsburg, Germany

[21] Appl. No.: 09/044,625

[22] Filed: Mar. 19, 1998

[30] Foreign Application Priority Data

Mar. 21, 1997 [DE] Germany .............. 197 11 789

[51] Int. Cl.⁷ .................. B23P 15/00; F01N 3/28
[52] U.S. Cl. .................. 29/890; 29/446; 29/455.1; 422/179; 422/180
[58] Field of Search ........................ 422/179, 177, 422/171, 180, 176; 29/890, 446, 455.1

[56] References Cited

U.S. PATENT DOCUMENTS

| | | | |
|---|---|---|---|
| 4,070,158 | 1/1978 | Siebels | 422/180 |
| 4,927,608 | 5/1990 | Worner et al. | 422/179 |
| 5,408,828 | 4/1995 | Kreucher et al. | 422/176 |

FOREIGN PATENT DOCUMENTS

| | | |
|---|---|---|
| 0665365 | 8/1995 | European Pat. Off. . |
| 2259817 | 6/1974 | Germany . |
| 2434102 | 2/1976 | Germany . |
| 3432283 | 3/1986 | Germany . |
| 3821397 | 12/1989 | Germany . |
| 4244315 | 3/1994 | Germany . |

Primary Examiner—Hien Tran
Attorney, Agent, or Firm—Helfgott & Karas, P.C.

[57] ABSTRACT

For the production of a motor vehicle exhaust gas cleaning device, which comprises an essentially cylindrical housing (G), at least one exhaust gas cleaning element (1) mounted in it, with a mounting mat (2) in between, and two transition cones (4) joined with the housing at the ends, a sheet metal cut-out (7) is placed around the at least one exhaust gas cleaning element (1) as a mantle, to form the housing, braced to the built-in parts (1 2, 3) to provide a firm attachment, and, in this position, closed to form a sleeve, while the two transition cones (4) are positioned in such a way, as the mantle formed from the sheet metal cut-out (7) is braced and formed into a sleeve, that they project into the housing (G) with support regions (6) which face the housing in each instance, and act as stops to delimit, the bracing process.

12 Claims, 2 Drawing Sheets

MOTOR-VEHICLE EXHAUST-GAS CLEANING DEVICE AND METHOD FOR MAKING SAME

The present invention relates to a method for making a motor-vehicle exhaust-gas cleaning device, which comprises a substantially cylindrical housing, at least one exhaust-gas cleaning element bedded therein together with an interposed bedding mat, and two transition cones joined together with the housing at the ends thereof, wherein to form the housing a cut-to-size metal sheet is wrapped as a jacket around the at least one exhaust-gas cleaning element, braced for firm contact with the internals, and in this position sealed, especially welded, to form a sleeve. It also relates to a motor-vehicle exhaust-gas cleaning device made by the said method.

Methods of the type cited in the introduction as well as corresponding exhaust-gas cleaning devices of various geometries belong to the prior art. In this connection, German Offenlegungschrifts [DE-OS; unexamined applications] 2259817, 2434102 and 4244315 as well as the published European Patent Application 0665365 can be mentioned in particular. It is common to all of the cited publications that, in making the exhaust-gas cleaning device, the cut-to-size metal sheet is first wrapped as a jacket around the internals, then forcibly braced to make firm contact with the internals and in this position welded to form a sleeve, after which the transition cones can be mounted on or in the housing formed in this way and welded together with it. The methods taught in the individual publications differ from each other exclusively with respect to the geometry of the connection of the transition cones with the housing. According to DE-OS 2259817 and 2434102, the transition cones are inserted in projections extending from the ends of the housing. In DE-OS 4244315 and EP Application 0665365, on the other hand, the transition cones are butt-joined to the ends of the housing, without any overlap of housing and transition cones in axial direction.

In all known methods, the outcome in practice is unsatisfactory mechanical strength of the exhaust-gas cleaning device. In particular, in all exhaust-gas cleaning devices made by the known methods, the extremely intense mechanical stresses and strains can cause damage at the welds joining the transition cones with the housing. This is largely related to and is an indirect consequence of the fact that the tolerance zone for the dimensions of the exhaust-gas cleaning elements bedded in the housing is unavoidably relatively broad. Depending on the actual dimensions of the particular exhaust-gas cleaning element and on the characteristics—which are also subject to some variations—of the bedding mat, the diameter of the housing may vary not inconsiderably from device to device. In the case of DE-OS 2259817 and 2434102, this leads to the situation in practice that in many cases a radial gap of such thickness exists between the end sections of the housing on the one hand and the sections of the transition cones protruding into the housing on the other hand that welding to process standard is no longer ensured. This occurs because, to allow for the possibility of coincidental use of an exhaust-gas cleaning element of minimum size and a bedding mat of minimum size, the transition cones must be made with correspondingly small diameter in the region of their end facing the housing in order that the transition cones can still be pushed into the housing; and this in turn leads in the case of exhaust-gas cleaning elements and bedding mats of nominal size, and even more so in the case of such with maximum size, unavoidably to the abovedescribed radial gap of no longer tolerable size between housing and transition cones.

Against the background of this "tolerance problem", the production methods described in DE-OS 4244315 and EP Application 0665365 adopt a different approach. Therein it is provided in each case that the rim zone, facing the housing, of the transition zone attached to the housing is provided with a radially extending collar. In this way a constantly firm welded joint to the transition cones can be made regardless of the tolerance-related dimensions of the housing. Because of other circumstances, however, this is not the case in practice. The disadvantage in this case is that the radial collar of the respective transition cone cannot—without cost-intensive postmachining—be made completely even; in fact, the collar is more or less uneven. And even the end edge of the cut-to-size metal sheet forming the housing is not absolutely plane. It already exhibits some roughness due to the cutting process; particularly in the region of the overlap of the two ends of the cut-to-size metal sheet rolled up to form the housing, however, axial displacement of the two ends relative to each other can occur, resulting at the ends next to the overlap region in an axial gap between the housing and the radial collar of the transition cone. The net result of using the methods known from the two last-cited publications is therefore that contact between the housing and the transition zone is limited to more or less some individual points, and this situation can cause cracks in the respective weld. This is even more likely in the case of the welds joining three parts with each other, as provided in the prior art.

In summary, therefore, it can be stated that all known prior-art production methods according to the preamble lead to unsatisfactory strength of the welded joints relative to the extreme mechanical stresses and strains, and thus to unsatisfactory service life of the corresponding exhaust-gas cleaning devices.

The object of the present invention is to provide a method of the type mentioned in the introduction, by means of the use of which exhaust-gas cleaning devices with improved strength can be made with minimum expense.

This object is achieved according to the present invention by the fact that, during bracing of the jacket formed from the cut-to-size metal sheet and sealing thereof to form a sleeve, the two transition cones are positioned in such a way that they protrude into the housing with support regions respectively facing the housing and acting as stops limiting the bracing effect. The method according to the invention therefore differs fundamentally from the prior art, in which the transition cones are not joined together with the housing until this has been made into the form of a sleeve by sealing the jacket, by the fact that support regions of the transition cones protrude into the jacket during bracing and sealing thereof, and thus are, as it were, "wrapped together" therewith. Consequently, there is obtained in entirely simple manner a method in which bracing of the jacket around the internals is achieved not merely by force, but instead by combined force and support length, in that the support region of the transition cones protruding into the jacket limit the forcible bracing of the jacket. This is true at least for a lower tolerance range for the exhaust-gas cleaning element and the bedding mat. It is achieved by the fact that the individual components of the exhaust-gas cleaning device are appropriately designed such that, at maximum tolerance (largest size of exhaust-gas cleaning element and bedding mat), a radial gap that certainly still permits welding to process standard is formed between the support regions of the transition cones on the one hand and the housing on the other. In this case, therefore, the support regions of the transition cones provided according to the invention and protruding into the jacket during clamping thereof act merely as stops limiting the clamping action if the actual dimensions of the exhaust-gas cleaning elements and/or of the bedding mat are so much smaller than the maximum size.

The invention makes use of the knowledge that, for reliable and durable bedding of the exhaust-gas cleaning elements, it is by no means necessary always to maintain a precisely defined preload force of the housing against the internals, but instead that deviations of the preload force within a certain bandwidth are not at all critical. This is also the reason that the limitation of the preload force by the support regions of the transition cones does not have any detrimental effects on the bedding of the exhaust-gas elements in the housing.

By application of the present invention, an optimized flow of force takes place between the housing and the transition cones joined thereto or (see below) between the housing and the external funnels surrounding the transition cones. A classical fillet weld is suitable for joining the corresponding parts. Trimming of the end edges of the housing and/or of the transition cones or possibly of the external funnels is not critical. A further advantage is the compensation for length tolerance that is possible by pushing the transition cones more or less deeply into the housing. Furthermore, in the use of the invention, in contrast to what happens in the prior art, self-centering of the transition cones with the housing is achieved. And even the spontaneous compensation for possible fabrication tolerances of the transition cones is an advantage of the pre sent invention compared with the prior art.

The method according to the invention is suitable for making exhaust-gas cleaning devices provided with a single-walled exhaust-gas inlet and outlet funnel. In this case, the transition cones are formed by the exhaust-gas inlet funnel and the exhaust-gas outlet funnel. Similarly, by application of the process according to the invention, exhaust-gas cleaning devices can be made in which the exhaust-gas inlet and outlet funnels are of double-walled construction. In this case, the support regions protruding into the jacket during clamping thereof and acting as stops can be provided on the inner and/or on the outer funnel, and so the transition cones in the sense of the teaching defined in the claims can be formed, depending on circumstances, by the inner funnels and/or by the outer funnels.

If the transition cones are formed by the outer funnels in the sense of the foregoing distinction, by the fact that these are provided with the support regions according to the invention, a preferred improvement of the invention provides that, following bracing and/or sealing of the jacket, the transition cones are joined firmly with the housing, especially by welding. Welding of the housing as well as joining of the transition cones therewith can therefore be achieved in one working step, with particular savings in time and costs.

Conversely, if the support regions limiting the bracing effect are disposed on the inner funnels, which then form the transition cones in the sense of the present terminology, the invention opens up several options for assembly of the outer funnels and joining thereof with the housing. On the one hand, it is possible that the outer funnels already surround the transition cones during bracing and sealing of the jacket. On the other hand, the outer funnels may be pushed over the inner funnels only after the housing has been braced and sealed in finished form. In both cases, for firm joining of the housing with the respective outer funnel, such funnel can fit into or fit over the housing at the end thereof as follows in detail from the preferred embodiment of the invention illustrated in the drawing and further explained hereinafter.

A particularly firm joint between the housing and the funnels joined firmly therewith (exhaust-gas inlet and outlet funnels in the case of single-walled funnels or outer funnels in the case of double-walled funnels) can be achieved when the corresponding funnel and the housing are in surface contact with each other in an overlap region, for which purpose the corresponding funnel is expediently provided with a substantially cylindrical joining region. For single-walled funnels, this joining region is identical with the support region, around which the corresponding cut-to-size metal sheet is wrapped during formation of the housing.

In the case of double-walled funnels, the invention permits the inner funnel to be guided axially movably in the manner of a sliding seat in order to compensate for thermal expansions in the outer funnel and/or in the housing. For this purpose, the inner funnel can be provided in particular with a conical or radially extending collar. A particularly preferred improvement of the invention in this respect is characterized in that each collar and the adjoining region of the inner funnel is divided into segments by a plurality of narrow incisions. This segmentation leads to resilient radial flexibility of the collar. This permits in particular spontaneous adaptation of the outside diameter of the collar to the respective inside diameter of the housing, which as stated hereinabove can vary depending on the actual dimensions of the internals. The said segmentation of the radial collar of the inner funnel therefore always leads to constantly good guidance of the inner funnel in the housing, despite varying housing dimensions.

It is self-evident that the present invention can be used regardless of the number of exhaust-gas cleaning elements bedded in the housing. It is also self-evident that the invention can be used regardless of the nature of the exhaust-gas cleaning elements (catalysts or carbon filters). Finally, it must be clarified that the invention is in no way restricted to symmetrically constructed exhaust-gas cleaning devices; instead, by application of the invention, it is possible for example to make exhaust-gas cleaning devices in which a double-walled funnel is provided on the inlet side and a single-walled funnel on the outlet side. The only important aspect is that transition cones having support regions protrude at both ends into the jacket forming the housing during bracing against the internals of the jacket formed from the cut-to-size metal sheet.

BRIEF DESCRIPTION OF THE DRAWINGS

The invention will be explained in more detail hereinafter by reference to several practical examples illustrated in the drawing, wherein.

Figure 1:
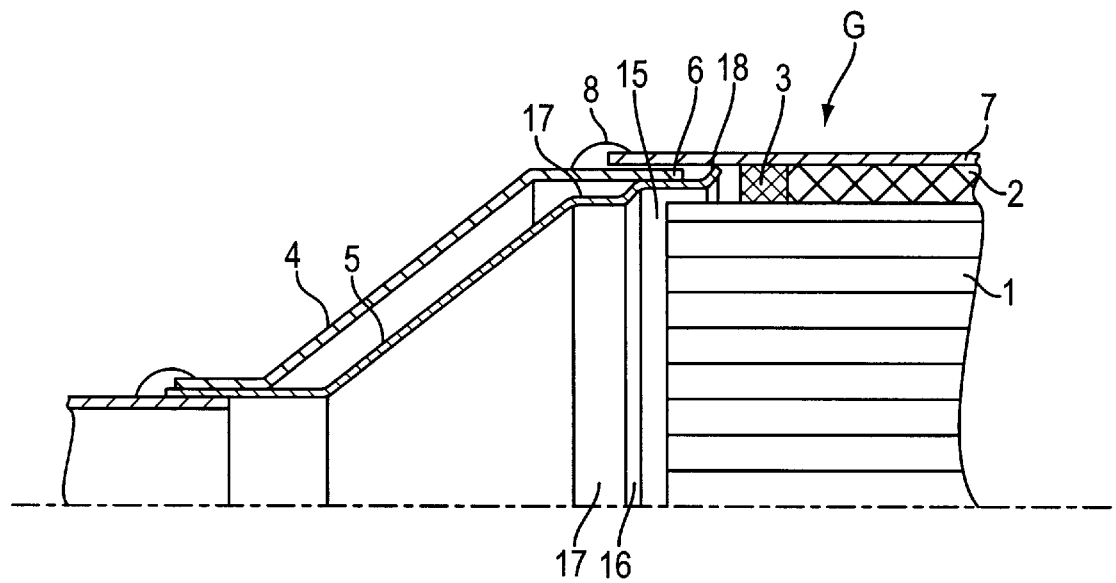
FIG. 1 shows a longitudinal section through a first preferred embodiment of an exhaust-gas cleaning device made according to the method of the invention.

To make the exhaust-gas cleaning device illustrated in FIG. 1, a bedding mat 2 of known type is wrapped around the exhaust-gas cleaning element 1, this bedding mat 2 being shorter in axial direction than exhaust-gas cleaning element 1. This makes it possible to place a protective ring 3 of type known in itself around the axial projection of the exhaust-gas cleaning element beyond the bedding mat, such ring serving to protect the end face of bedding mat 2 from erosion by the pulsating exhaust gas. Transition cones 4, each forming the outer funnel of a funnel unit that additionally comprises an inner funnel 5, are then positioned on both the inlet and outlet ends. Between the outer funnel and inner funnel there is located a hollow space, which can but does not have to be filled in known manner with insulating material.

The transition cone 4 formed by the outer funnel has a cylindrical support region 6. Therein there is guided axially movably a cylindrical guide section 15 of inner funnel 5 in the manner of a sliding seat, in order to compensate for differential thermal expansion of inner funnel and outer funnel. To one end of guide section 15 there is attached, via a step 16, a further cylindrical section 17, the inside width of which is matched to the diameter of exhaust-gas cleaning element 1. At the other end a collar 18 is attached to guide section 15.

Only after transition cones 4 have been brought into the position illustrated in the drawing is a cut-to-size metal sheet 7 for forming a jacket wrapped around exhaust-gas cleaning element 1 together with bedding mat 2 and protective ring 3 as well as around support regions 6 of transition cones 4 protruding into the cut-to-size metal sheet and then initially braced radially inward against the internals. In the process, support regions 6 act as stops limiting the bracing action in such a way that cut-to-size metal sheet 7 is in contact with the outside of the support regions, if it happens that the internals comprising exhaust-gas cleaning element 1, bedding mat 2 and protective ring 3 are smaller than a minimum size. In contrast, if the internals exceed such minimum size, bracing of the cut-to-size metal sheet 7 against the internals is limited by the force opposing such bracing. In this case, a slight radial gap indeed remains between the support regions 6 of transition cones 4 on the one hand and the end regions of cut-to-size metal sheet 7 overlapping these. The individual components of the exhaust-gas cleaning device are sufficiently matched to each other in terms of their dimensions, however, that even for the largest size of the internals any annular gap is still so small that production to process standard of a fillet weld 8, which joins the housing G formed as a sleeve by sealing of the cut-to-size metal sheet 7 with the transition cones 4, is assured with certainty.

The illustrated geometry of inner funnel 5 in its region adjacent to exhaust-gas cleaning element 1 results in advantageous shielding of weld 8, with the result that this is not subjected to such severe thermal loads as in known exhaust-gas cleaning devices. Analogous reasoning applies to FIGS. 2 and 3 explained hereinafter.

Figure 2:
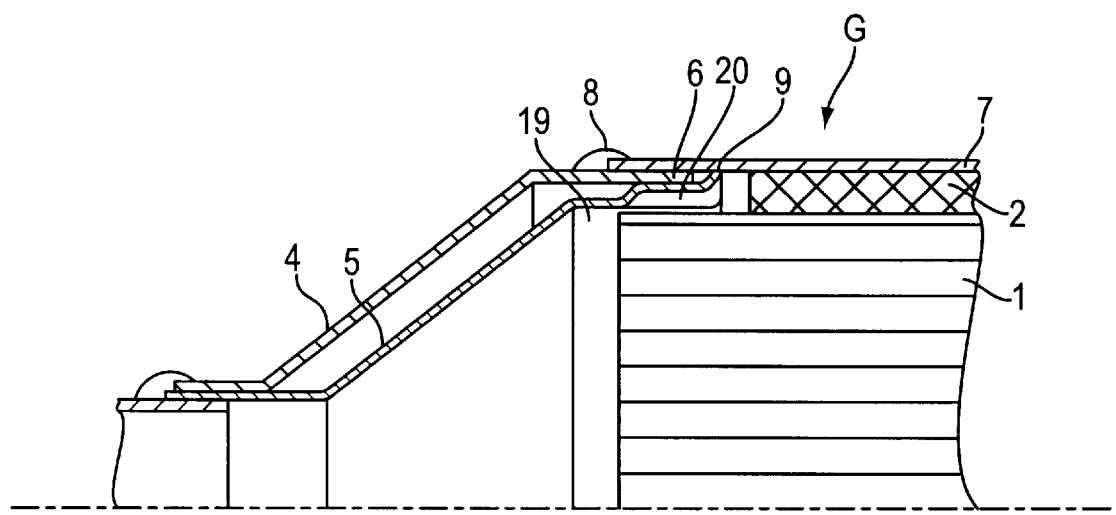
FIG. 2 shows a longitudinal section through a second preferred embodiment of an exhaust-gas cleaning device made according to the method of the invention.

The production of the exhaust-gas cleaning device illustrated in FIG. 2 does not differ substantially from the production of the exhaust-gas cleaning device according to FIG. 1. In turn, the funnel units each comprising a transition cone 4 formed by an outer funnel and an inner funnel 5 are positioned at the ends of an exhaust-gas cleaning element 1 wrapped in a bedding mat 2. Thereafter cut-to-size metal sheet 7 is wrapped around the internals and braced thereagainst. Finally, after the cut-to-size metal sheet has been welded in the form of a sleeve to form a housing G, the housing is welded together with the two transition cones 4 by one fillet weld 8 each. The support regions 6 of the two transition cones in turn serve as stops, which come into play if the internals are smaller than a given minimum size. The exhaust-gas cleaning device illustrated in FIG. 2 differs from that according to FIG. 1, however, to the effect that the inner funnel is not in surface contact with the inside of support region 6 of transition cone 4; instead, cylindrical section 19 of inner funnel 5 is provided with a plurality of guide and positioning beads 20, which are distributed uniformly over the circumference and are in contact with the inside of support region 6 of transition cone 4. Furthermore, there is then provided on cylindrical section 19 of inner cone 5 a radial collar 9, the outside diameter of which corresponds substantially to the outside diameter of support region 6 and which is guided in the inside of housing G formed by the sealed cut-to-size metal sheet 7. In this connection, the end region of inner funnel 5 facing the exhaust-gas cleaning element can be made flexible in radial direction, in that a plurality of narrow incisions divide collar 9 and extend into the adjoining cylindrical region 19 of inner funnel 5 (see FIG. 3). In this way a corresponding number of segments that are resiliently flexible in radial direction are formed. This makes it possible for radial collar 9 of inner funnel 5 to have, in the stress-free condition, a slightly larger outside diameter than that of support region 6 of the outer funnel forming transition cone 4. Even if the dimensions of the internals have the largest size, whereby the —relatively wide—housing G formed from cut-to-size metal sheet 7 is in contact with support regions 6 of transition cones 4 only partly or not at all, guidance of inner funnel 5 in the housing is ensured in this way. The hollow space existing between the inner and outer funnels of the exhaust-gas cleaning device according to FIG. 2 can also be filled with insulating material.

In the practical examples of the invention illustrated in FIGS. 1 and 2, therefore, each of the outer funnels of a double funnel forms the "transition cone" according to the terminology of the present invention, each of which is provided with a support region protruding into the housing to be formed. This makes it clear that it is also entirely possible to apply the invention to such—not illustrated—exhaust-gas cleaning devices that are provided with single-walled inlet and outlet funnels. This is so because the stop which is important for production and limits the bracing of cut-to-size metal sheet 7 against the internals simultaneously functions as support region 6 of the outer funnel.

Figure 3:
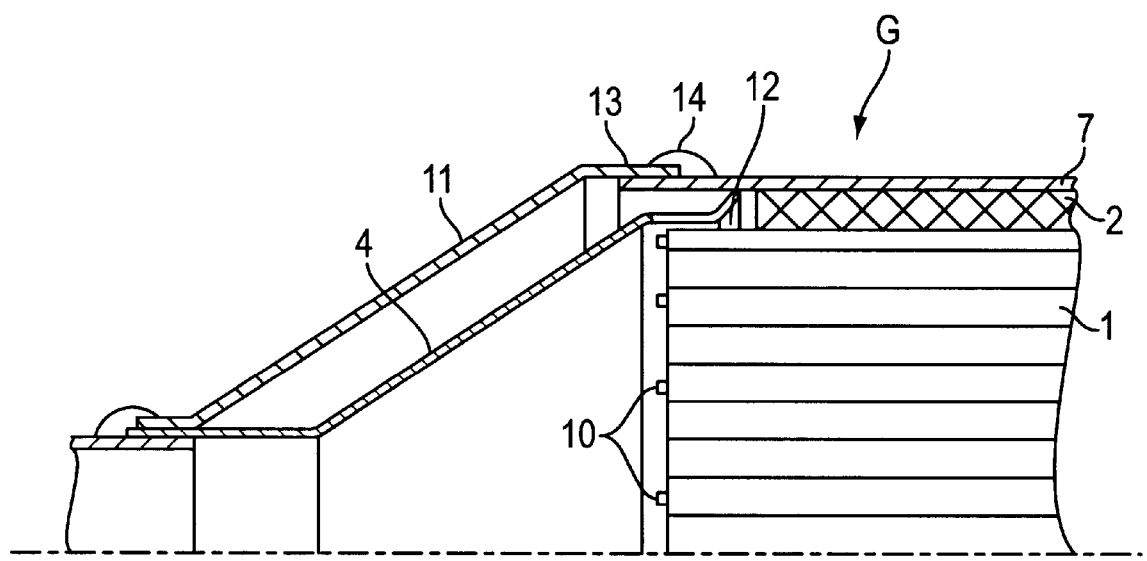
FIG. 3 shows a longitudinal section through a third preferred embodiment of an exhaust-gas cleaning device made according to the method of the invention.

The situation is different in FIG. 3, which is explained hereinbelow. In this case the "transition cone" in the sense of the present invention is formed by the inner funnel of a double funnel. In contrast, the outer funnel of the corresponding double funnel does not protrude into the housing; instead it overlaps the housing by enclosing the respective end section thereof.

Specifically, to make the exhaust-gas cleaning device illustrated in FIG. 3, it is expedient to proceed as follows: First of all bedding mat 2 is wrapped around exhaust-gas cleaning element 1. Then the two funnel units comprising respectively an outer funnel 11 and an inner funnel forming transition cone 4 are brought into assembly position. This, however, does not correspond to the end position illustrated in FIG. 3; instead, in the said assembly position, the funnel units comprising outer and inner funnels are spaced at a relatively large axial distance from exhaust-gas cleaning element 1, with the result, in fact, that cut-to-size metal sheet 7 can be wrapped around the internals and the support region formed by a conical collar 12 of the inner funnel. After cut-to-size metal sheet 7 has been sealed in the form of a sleeve to form a housing G, the two funnel units are pushed axially inward toward the exhaust-gas cleaning element 1, in which process a cylindrical section 13 of outer funnel 11 surrounds the end sections of the housing. In this position the housing and outer funnels 11 are welded together by means of one fillet weld 14 each. Conical collar 12 of the inner funnel and the adjoining cylindrical region are divided by a plurality of narrow incisions 10 into a corresponding number of segments. These are radially flexible to a certain extent, the degree of radial deformability being determined largely by the number and clear width of incisions 10. Compression of the segments is limited to the position in which the individual adjacent segments are forced into contact with each other. It is pointed out that, in this compressed position of the segments, the radial distance between the outside circumference of conical collar 12 of the inner funnel and the inside wall of cylindrical section 13 of the outer funnel is much larger than the wall thickness of housing G defined by the thickness of cut-to-size metal sheet 7. This is so because, in this case also, the support region of transition cone 4 again acts as the stop to limit bracing of the housing jacket only if the internals are smaller than a given size. In contrast, cylindrical section 13 of outer funnel 11 is dimensioned such that, even at largest size of exhaust-gas cleaning element 1 and bedding mat 2, the—correspondingly wide—housing formed by cut-to-size metal sheet 7 can still be pushed into the outer funnels.

By virtue of the axial projection of the inner funnel beyond the outer funnel and toward the exhaust-gas cleaning element, the unit comprising inner funnel and outer funnel can, as detailed by the foregoing explanations, already be prefabricated and pushed altogether from the initially occupied assembly position into the end position illustrated in the drawing, after the housing has been sealed. Such a process sequence is not necessarily the case, however. Obviously the exhaust-gas cleaning device illustrated in FIG. 3 can also be made by a sequence in which outer funnel 11 is pushed over transition cone 4 forming the inner funnel only after cut-to-size metal sheet 7 has been wrapped around collar 12 of the inner funnel as well as the internals and sealed to form a housing. In this respect two alternative process-related options are available to make the embodiment of the exhaust-gas cleaning device illustrated in FIG. 3.

All of the practical examples described in the foregoing are therefore consistently characterized by the fact that, during bracing of the jacket formed from the cut-to-size metal sheet and sealing thereof to form a sleeve, support regions of the two transition cones protrude into the housing and act as stops limiting the bracing effect, with the result that variations of the dimensions of the internals within a relatively broad tolerance zone have only a limited influence on the dimensions of the housing, which in turn allows the joint thereof to the adjacent components of the exhaust-gas cleaning device to be made to process standard and thus durably firm.

What is claimed is:

1. A method for making a motor-vehicle exhaust-gas cleaning device, which device comprises a substantially cylindrical sleeve housing (G), internals comprising at least one exhaust-gas cleaning element (1) bedded in said housing together with an interposed bedding mat (2), and two transition cones (4) joined together with the housing at the ends thereof, comprising the steps of:

wrapping a cut-to-size metal sheet (7) around said internals, and bracing said cut-to-size metal sheet for firm contact with the internals (1, 2, 3), and in this position sealing to form said sleeve housing, wherein during bracing of the cut-to-size metal sheet (7) and sealing thereof to form the sleeve housing, positioning said two transition cones (4) in such a way that said two transition cones protrude into the housing (G) with support regions (6; 12) respectively facing the housing and acting as stops limiting the bracing of the cut-to-size metal sheet for firm contact with the internals.

2. A method according to claim 1, wherein, following bracing and/or sealing of the metal sheet, the transition cones (4) are joined firmly with the housing (G).

3. A method according to claim 1, wherein following bracing and/or sealing of the metal sheet, outer funnels (11) surrounding the transition cones are joined firmly with the housing (G).

4. A method according to claim 3, wherein following bracing and/or sealing of the metal sheet, the outer funnels (11) are pushed over the transition cones (4) before the outer funnels are firmly joined with the housing.

5. A method according to claim 3, wherein the outer funnels (11) surround the transition cones (4) during bracing and sealing of the metal sheet.

6. A method according to claim 1, wherein during bracing of the metal sheet, units, each comprising a transition cone (4) partially surrounded by an outer funnel (11), are brought into an assembly position in which the respective transition cone protrudes into said housing whereas said outer funnel is pushed following sealing of said metal sheet in an axial direction into a position in which the outer funnel (11) fits over the housing in which position said outer funnels are joined firmly with the housing.

7. A method according to claim 1, wherein the support regions (6) of the transition cones (4) are made with substantially cylindrical shape to allow surface contact with the housing (G).

8. A method according to claim 1, wherein the transition cone (4) surrounds an inner cone (5), which ends in a radial collar (9) which can be guided axially movably.

9. A method according to claim 8, wherein the radial collar (9) is guided in the housing (G).

10. A method according to claim 9, wherein the radial collar (9) is divided by a plurality of incisions into segments that are resiliently flexible in radial direction.

11. A method according to claim 3, wherein the support regions (12) of the transition cones (4) are formed by inner funnels having a substantially radial or conical collar.

12. A method according to claim 3, wherein the support regions (12) of the transition cones (4) are divided by a plurality of incisions (10) into segments that are resiliently flexible in radial direction.

* * * * *